United States Patent
Yin et al.

(10) Patent No.: US 10,498,641 B2
(45) Date of Patent: Dec. 3, 2019

(54) FORWARD ENTRY GENERATING METHOD, FORWARD NODE, AND CONTROLLER

(71) Applicant: Huawei Technologies Co., Ltd., Shenzhen, Guangdong (CN)

(72) Inventors: Yuanbin Yin, Beijing (CN); Zhenbin Li, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 99 days.

(21) Appl. No.: 15/099,201

(22) Filed: Apr. 14, 2016

(65) Prior Publication Data

US 2016/0234107 A1    Aug. 11, 2016

Related U.S. Application Data

(63) Continuation of application No. PCT/CN2014/086364, filed on Sep. 12, 2014.

(30) Foreign Application Priority Data

Oct. 14, 2013    (CN) .......................... 2013 1 0478671

(51) Int. Cl.
*H04L 12/723*    (2013.01)
*H04L 12/751*    (2013.01)

(52) U.S. Cl.
CPC .............. *H04L 45/50* (2013.01); *H04L 45/02* (2013.01)

(58) Field of Classification Search
None
See application file for complete search history.

(56) References Cited

U.S. PATENT DOCUMENTS 7,885,259 B2    2/2011    Filsfils
2003/0117954 A1*   6/2003   De Neve ............. H04L 12/4641
                                                                       370/230

(Continued)

FOREIGN PATENT DOCUMENTS

CN        1357999 A    7/2002
CN      101242342 A    8/2008

(Continued)

OTHER PUBLICATIONS

"Information technology—Telecommunications and information exchange between systems—Intermediate System to Intermediate System intra-domain routeing information exchange protocol for use in conjunction with the protocol for providing the connectionless-mode network service (ISO 8473)", International Standard ISO/IEC 10589, Nov. 15, 2002, 210 pages.

(Continued)

*Primary Examiner* — Christopher T Wyllie
(74) *Attorney, Agent, or Firm* — Womble Bond Dickinson (US) LLP

(57) ABSTRACT

The present invention discloses a forward entry generating method, a forward node, and a controller. The method includes: receiving, by a first forward node, MPLS forwarding path information, which is sent by a controller, of a MPLS forwarding path, where the MPLS forwarding path information includes: ingress node information, transit node information, and egress node information; sending the MPLS forwarding path information to a third forward node; and generating an MPLS forward entry of the first forward node according to the MPLS forwarding path information. According to the method, the forward node, and the controller in embodiments of the present invention, it can be avoided that the controller sends, in a point-to-point manner, MPLS forward entries to all forward nodes that an MPLS forwarding path passes through, thereby effectively improv- (Continued)

ing efficiency of generating an MPLS forward entry and reducing occupation of outbound bandwidth of the controller.

14 Claims, 5 Drawing Sheets

(56) References Cited

U.S. PATENT DOCUMENTS

| | | | | |
|---|---|---|---|---|
| 2003/0152024 | A1* | 8/2003 | Yang | H04J 3/14 370/216 |
| 2004/0039839 | A1* | 2/2004 | Kalyanaraman | H04L 45/00 709/238 |
| 2005/0220072 | A1* | 10/2005 | Boustead | H04L 29/06 370/351 |
| 2006/0002394 | A1* | 1/2006 | Kuranari | H04L 45/02 370/392 |
| 2006/0039371 | A1* | 2/2006 | Castro | H04L 12/42 370/389 |
| 2007/0263634 | A1 | 11/2007 | Reeves et al. | |
| 2009/0059923 | A1 | 3/2009 | Guo et al. | |
| 2009/0086621 | A1* | 4/2009 | Wan | H04L 45/00 370/218 |
| 2010/0272436 | A1* | 10/2010 | Mizutani | H04B 10/272 398/25 |
| 2011/0267979 | A1* | 11/2011 | Suzuki | H04L 45/12 370/254 |
| 2013/0016723 | A1* | 1/2013 | Arad | G06F 9/45558 370/392 |
| 2013/0107712 | A1* | 5/2013 | Allan | H04L 45/24 370/235 |
| 2013/0114619 | A1* | 5/2013 | Wakumoto | H04L 12/4641 370/406 |
| 2013/0272141 | A1* | 10/2013 | Mashimo | H04L 43/18 370/248 |
| 2013/0286893 | A1* | 10/2013 | Zhu | H04L 45/64 370/254 |
| 2014/0334286 | A1* | 11/2014 | Ernstrom | H04L 45/04 370/216 |
| 2015/0124830 | A1 | 5/2015 | Hu et al. | |
| 2015/0146571 | A1 | 5/2015 | Xiong et al. | |
| 2016/0234107 | A1* | 8/2016 | Yin | H04L 45/02 |

FOREIGN PATENT DOCUMENTS

| | | |
|---|---|---|
| CN | 101325584 A | 12/2008 |
| CN | 102449964 A | 5/2012 |
| CN | 102884762 A | 1/2013 |
| CN | 102907051 A | 1/2013 |
| EP | 2 720 415 A1 | 4/2014 |

OTHER PUBLICATIONS

"OpenFlow Switch Specification", Version 1.5.0 (Protocol version 0x06), Open Networking Foundation, Dec. 19, 2014, 277 pages.
J. Moy, "OSPF Version 2", Network Working Group, Apr. 1998, 244 pages.
H. Smit et al., "Intermediate System to Intermediate System (IS-IS) Extensions for Traffic Engineering (TE)", Network Working Group, Jun. 2004, 13 pages.
L. Anderson et al., "LDP Specification", Network Working Group, Oct. 2007, 135 pages.
Y. Rekhter et al., "Carrying Label Information in BGP-4", Network Working Group, May 2001, 135 pages.
A. Farrel, Ed. et al., "Inter-Domain MPLS and GMPLS Traffic Engineering—Resource Reservation Protocol-Traffic Engineering (RSVP-TE) Extensions", Network Working Group, Feb. 2008, 25 pages.
H. Gredler, Ed. et al., "Advertising MPLS labels in OSPF", Open Shortest Path First IGP, Apr. 12, 2013, 15 pages.
Z. Li et al., "A Framework of MPLS Global Label", Network Working Group, Jul. 11, 2013, 11 pages.
P. Ashwood-Smith et al., "SDN State Reduction", Internet Research Task Force, Jul. 3, 2013, 23 pages.
Z. Li et al., "A Framework of MPLS Global Label", Network Working Group, Jul. 3, 2014, 14 pages.

\* cited by examiner

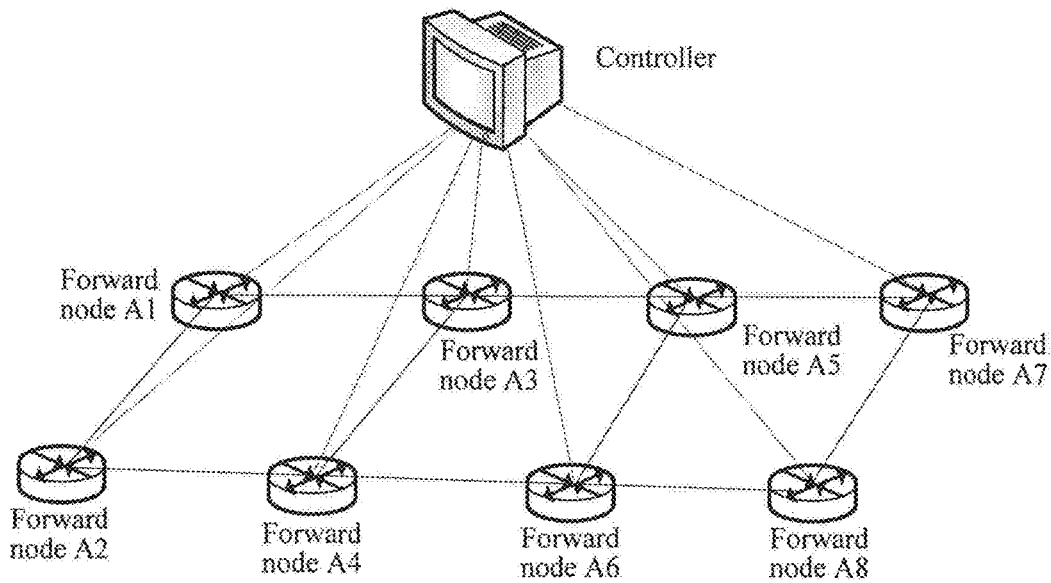

A first forward node receives MPLS forwarding path information, which is sent by a controller or a second forward node, of an MPLS forwarding path, where the MPLS forwarding path information includes: ingress node information, transit node information, and egress node information — 110

Send the MPLS forwarding path information to a third forward node — 120

Generate an MPLS forward entry of the first forward node according to the MPLS forwarding path information — 130

FIG. 2

FORWARD ENTRY GENERATING METHOD, FORWARD NODE, AND CONTROLLER

CROSS-REFERENCE TO RELATED APPLICATIONS

This application is a continuation of International Application No. PCT/CN2014/086364, filed on Sep. 12, 2014, which claims priority to Chinese Patent Application No. 201310478671.4, filed on Oct. 14, 2013, both of which are hereby incorporated by reference in their entireties.

TECHNICAL FIELD

The present invention relates to the field of communications, and in particular, to a forward entry generating method, a forward node, and a controller.

BACKGROUND

The idea of software-defined networking (Software-defined networking, SDN) is to separate a control plane from a forwarding plane of a network device, so that a network hardware device such as a router retains only the forwarding plane and control rights of the control plane are given to a controller, thereby implementing separation between software and hardware. In this network structure, the controller (Controller) controls all forward nodes on the network. To add a service, a user only needs to operate the controller. In addition, the controller can compute, according to a service requirement of the user, a forwarding path needed by each service, that is, a Multiprotocol Label Switching (MultiProtocol Label Switching, MPLS) forwarding path, generate an MPLS forward entry, and then deliver the MPLS forward entry to each forward node that the MPLS forwarding path passes through. After receiving the MPLS forward entry, the forward node can perform MPLS packet forwarding according to the MPLS forward entry.

In the prior art, the MPLS forward entry of each forward node is delivered in a point-to-point manner by the controller. Therefore, a technical problem exists: for each MPLS forwarding path, the controller needs to deliver, to each forward node in the MPLS forwarding path, an MPLS forward entry corresponding to the forward node. When there are many forward nodes on the network and the path is complex, the controller frequently interacts with the forward nodes, efficiency of delivering the MPLS forward entries is relatively low, and a large amount of bandwidth of the controller is occupied.

SUMMARY

Embodiments of the present invention provide a forward entry generating method, a controller and a forward node, to resolve a problem that efficiency of generating an MPLS forward entry is relatively low and relatively large bandwidth of a controller is occupied because the controller frequently interacts with forward nodes.

According to a first aspect, a forward entry generating method is provided, where the method includes: receiving, by a first forward node, MPLS forwarding path information, which is sent by a Controller or a second forward node, of an MPLS forwarding path, where the MPLS forwarding path information includes: ingress node information, transit node information, and egress node information; sending the MPLS forwarding path information to a third forward node; and generating an MPLS forward entry of the first forward node according to the MPLS forwarding path information.

With reference to the first aspect, in a first possible implementation manner of the first aspect, the generating an MPLS forward entry of the first forward node according to the MPLS forwarding path information includes: determining, according to any information of the ingress node information, the transit node information, and the egress node information that are in the MPLS forwarding path information, whether the first forward node is included in the MPLS forwarding path; and when determining that the first forward node is included in the MPLS forwarding path, generating the MPLS forward entry of the first forward node according to the MPLS forwarding path information.

With reference to the first possible implementation manner of the first aspect, in a second possible implementation manner of the first aspect, the MPLS forwarding path information further includes a path identity (Identity, ID) of the MPLS forwarding path; and the determining, according to any information of the ingress node information, the transit node information, and the egress node information that are in the MPLS forwarding path information, whether the first forward node is included in the MPLS forwarding path includes: determining whether MPLS forwarding path record information of the first forward node includes the path ID, where the MPLS forwarding path record information is used to record a path ID of an MPLS forwarding path corresponding to an MPLS forward entry that is already generated by the first forward node; and when determining that the MPLS forwarding path record information of the first forward node does not include the path ID, determining, according to any information of the ingress node information, the transit node information, and the egress node information that are in the MPLS forwarding path information, whether the first forward node is included in the MPLS forwarding path.

With reference to the first aspect or any one of the foregoing possible implementation manners of the first aspect, a third possible implementation manner of the first aspect is further provided, and in the third possible implementation manner of the first aspect, the MPLS forwarding path information further includes a first node quantity and a second node quantity, where the first node quantity indicates a total node quantity of forward nodes that the MPLS forwarding path passes through, and the second node quantity indicates a quantity of nodes that already generate MPLS forward entries among the forward nodes that the MPLS forwarding path passes through; and the sending the MPLS forwarding path information to a third forward node includes: determining a value relationship between the first node quantity and the second node quantity; and when determining that the first node quantity is unequal to the second node quantity, sending the MPLS forwarding path information to the third forward node.

According to a second aspect, a forward entry generating method is provided, where the method includes: determining, by a Controller, an MPLS forwarding path; generating MPLS forwarding path information of the MPLS forwarding path, where the MPLS forwarding path information includes: ingress node information, transit node information, and egress node information; and sending the MPLS forwarding path information to a first forward node, so that the first forward node generates an MPLS forward entry of the first forward node according to the MPLS forwarding path information, and so that the first forward node sends the MPLS forwarding path information to a second forward node.

With reference to the second aspect, in a first possible implementation manner of the second aspect, the MPLS forwarding path information further includes: an MPLS label allocated by the Controller to the MPLS forwarding path.

With reference to the first possible implementation manner of the second aspect, in a second possible implementation manner of the second aspect, the MPLS label is a global MPLS label, and the global MPLS label uniquely indicates the MPLS forwarding path.

With reference to the first possible implementation manner of the second aspect, in a third possible implementation manner of the second aspect, the MPLS label is a local MPLS label, and the local MPLS label indicates an MPLS label allocated by the Controller to each forward node that the MPLS forwarding path passes through.

With reference to the second aspect or any one of the foregoing possible implementation manners of the second aspect, a fourth possible implementation manner of the second aspect is further provided, and in the fourth possible implementation manner of the second aspect, the MPLS forwarding path information further includes a path identity ID of the MPLS forwarding path.

With reference to the second aspect or any one of the foregoing possible implementation manners of the second aspect, a fifth possible implementation manner of the second aspect is further provided, and in the fifth possible implementation manner of the second aspect, the MPLS forwarding path information further includes a first node quantity and a second node quantity, where the first node quantity indicates a total node quantity of forward nodes that the MPLS forwarding path passes through, and the second node quantity indicates a quantity of nodes that already generate MPLS forward, entries among the forward nodes that the MPLS forwarding path passes through.

According to a third aspect, a forward node is provided, where the forward node includes: a path receiving module, configured to receive MPLS forwarding path information, which is sent by a Controller or a second forward node, of an MPLS forwarding path, where the MPLS forwarding path information includes: ingress node information, transit node information, and egress node information; a sending module, configured to send the MPLS forwarding path information received by the path receiving module to a third forward node; and a forward entry generating module, configured to generate an MPLS forward entry of the forward node according to the MPLS forwarding path information received by the path receiving module.

With reference to the third aspect, in a first possible implementation manner of the third aspect, the forward entry generating module includes: a first determining unit, configured to determine, according to any information of the ingress node information, the transit node information, and the egress node information that are in the MPLS forwarding path information, whether the first forward node is included in the MPLS forwarding path received by the path receiving module; and a generating unit, configured to: when the first determining unit determines that the forward node is included in the MPLS forwarding path, generate the MPLS forward entry of the forward node according to the MPLS forwarding path information.

With reference to the first possible implementation manner of the third aspect, in a second possible implementation manner of the third aspect, the MPLS forwarding path information received by the path receiving module further includes a path identity ID of the MPLS forwarding path, and the first determining unit further includes: a path identity determining subunit, configured to determine whether MPLS forwarding path record information of the first forward node includes the path ID, where the MPLS forwarding path record information is used to record a path ID of an MPLS forwarding path corresponding to an MPLS forward entry that is already generated by the first forward node; and a forward node determining subunit, configured to: when the path identity determining subunit determines that the MPLS forwarding path record information of the first forward node does not include the path ID, determine, according to any information of the ingress node information, the transit node information, and the egress node information that are in the MPLS forwarding path information, whether the forward node is included in the MPLS forwarding path.

With reference to the third aspect or any one of the foregoing possible implementation manners of the third aspect, a third possible implementation manner of the third aspect is further provided, and in the third possible implementation manner of the third aspect, the MPLS forwarding path information received by the path receiving module further includes a first node quantity and a second node quantity, where the first node quantity indicates a total node quantity of forward nodes that the MPLS forwarding path passes through; and the second node quantity indicates a quantity of nodes that already generate MPLS forward entries among the forward nodes that the MPLS forwarding path passes through, and the sending module includes: a second determining unit, configured to determine a value relationship between the first node quantity and the second node quantity; and a sending unit, configured to: when the second determining unit determines that the first node quantity is unequal to the second node quantity, send the MPLS forwarding path information to the third forward node.

According to a fourth aspect, a controller (Controller) is provided, where the Controller includes: a path determining module, configured to determine a Multiprotocol Label Switching MPLS forwarding path; a path generating module, configured to generate MPLS forwarding path information of the MPLS forwarding path determined by the path determining module, where the MPLS forwarding path information includes: ingress node information, transit node information, and egress node information; and a path sending module, configured to send the MPLS forwarding path information generated by the path determining module to a first forward node, so that the first forward node generates an MPLS forward entry of the first forward node according to the MPLS forwarding path information, and so that the first forward node sends the MPLS forwarding path information to a second forward node.

With reference to the fourth aspect, in a first possible implementation manner of the fourth aspect, the path generating module includes: a label allocation unit, configured to allocate an MPLS label to the MPLS forwarding path determined by the path determining module; and a path generating unit, configured to generate the MPLS forwarding path information of the MPLS forwarding path, where the MPLS forwarding path information further includes the MPLS label.

With reference to the first possible implementation manner of the fourth aspect, in a second possible implementation manner of the fourth aspect, the MPLS label allocated by the label allocation unit to the MPLS forwarding path is a global MPLS label, and the MPLS label included in the MPLS forwarding path information generated by the path generating unit is the global MPLS label.

With reference to the first possible implementation manner of the fourth aspect, in a third possible implementation manner of the fourth aspect, the label allocation unit allocates a local MPLS label to each forward node that the MPLS forwarding path passes through, where the MPLS label included in the MPLS forwarding path information generated by the path generating unit is the local MPLS label of each forward node that the MPLS forwarding path passes through.

With reference to the fourth aspect or any one of the foregoing possible implementation manners of the fourth aspect, a fourth possible implementation manner of the fourth aspect is further provided, and in the fourth possible implementation manner of the fourth aspect, the path generating module is further configured to generate a path identity ID of the MPLS forwarding path.

With reference to the fourth aspect or any one of the foregoing possible implementation manners of the fourth aspect, a fifth possible implementation manner of the fourth aspect is further provided, and in the fifth possible implementation manner of the fourth aspect, the path generating module is further configured to generate a first node quantity and a second node quantity, where the first node quantity indicates a total node quantity of forward nodes that the MPLS forwarding path passes through, and the second node quantity indicates a quantity of nodes that already generate MPLS forward entries among the forward nodes that the MPLS forwarding path passes through.

Based on the foregoing technical solutions, according to the forward entry generating method, the forward node and the controller in the embodiments of the present invention, the controller sends MPLS forwarding path information to some forward nodes on a network, and the some forward nodes send the MPLS forwarding path information to another forward node on the network, so that all forward nodes that a MPLS forwarding path passes through can acquire the MPLS forwarding path information and can generate corresponding MPLS forward entries, which can avoid that the controller sends, in a point-to-point manner, the MPLS forward entries to all the forward nodes that the MPLS forwarding path passes through, thereby effectively improving efficiency of generating an MPLS forward entry and reducing occupation of outbound bandwidth of the controller.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic structural diagram of an SDN network in an application scenario according to an embodiment of the present invention;

FIG. 2 is a schematic flowchart of a forward entry generating method according to an embodiment of the present invention;

DETAILED DESCRIPTION

Figure 3:
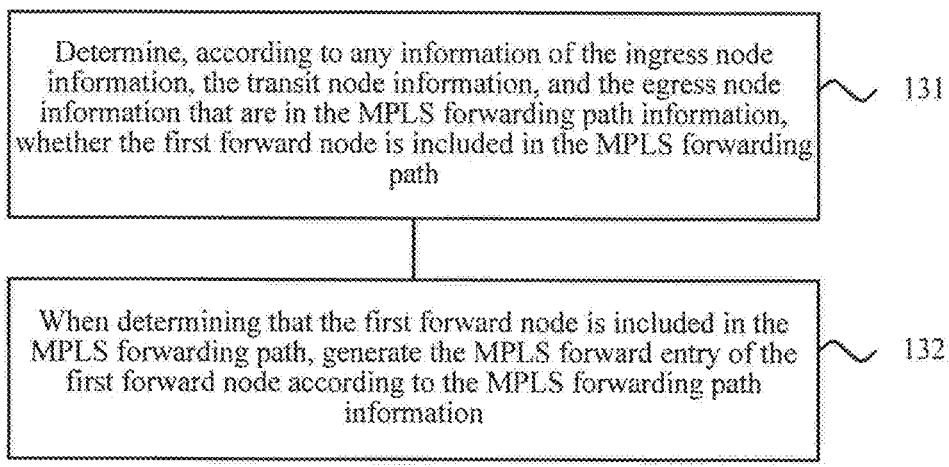
FIG. 3 is another schematic flowchart of a forward entry generating method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A form of a Controller is not specifically limited in the embodiments of the present invention, for example, the controller may be a base station (Base Station) on a radio network, a radio network controller (Radio Network Controller, RNC), or the like.

A form of a forward node is not specifically limited in the embodiments of the present invention either, for example, the forward node may be a router or a switch.

FIG. 1 is a schematic structural diagram of an SND network in an application scenario according to an embodiment of the present invention.

The idea of SDN is to separate a control plane from a forwarding plane of a network device, so that a network hardware device such as a router retains only the forwarding plane and control rights of the control plane are given to a controller (Controller), thereby implementing separation between software and hardware. As shown in FIG. 1, in this network structure, the controller controls all forward nodes on the network. To add a service, a user only needs to operate the controller. In addition, the controller can compute, according to a service requirement of the user, a forwarding path needed by each service, that is, an MPLS forwarding path, generate an MPLS forward entry of the MPLS forwarding path, and then deliver the MPLS forward entry to each forward node that the MPLS forwarding path passes through. After receiving the MPLS forward entry, the forward node can perform MPLS packet forwarding according to the MPLS forward entry.

In the prior art, an MPLS forward entry of each forward node in an MPLS forwarding path is generated by the controller and delivered in a point-to-point manner to the forward node. Therefore, a technical problem exists: for each MPLS forwarding path, the controller needs to deliver, to each forward node in the path, an MPLS forward entry corresponding to the forward node. When there are many forward nodes on the network and the path is complex, the controller frequently interacts with the forward nodes, efficiency of delivering the MPLS forward entries is relatively low, and a requirement on outbound bandwidth of the controller is relatively high.

Referring to FIG. 2, FIG. 2 is a schematic flowchart of a forward entry generating method according to an embodiment of the present invention. The forward entry generating method 100 may be executed by a first forward node. The forward entry generating method 100 includes:

110: A first forward node receives MPLS forwarding path information, which is sent by a Controller or a second forward node, of an MPLS forwarding path, where the MPLS forwarding path information includes: ingress node information, transit node information, and egress node information.

120: Send the MPLS forwarding path information to a third forward node.

130: Generate an MPLS forward entry of the first forward node according to the MPLS forwarding path information.

The first forward node receives the MPLS forwarding path information sent by the controller or the second forward node, where the MPLS forwarding path information includes: the ingress node information, the transit node information, and the egress node information. The node information indicates forward nodes that the MPLS forwarding path passes through, for example, the node information may include an IP address of a corresponding forward node. After receiving the MPLS forwarding path information, the first forward node sends the MPLS forwarding path information to a third forward node that has a connection relationship with the first forward node, and determines an MPLS forward entry of the first forward node according to the MPLS forwarding path information.

Therefore, according to the forward entry generating method in this embodiment of the present invention, a controller sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and reducing occupation of outbound bandwidth of the controller.

It should be understood that, in this embodiment of the present invention, the first forward node may be any forward node on the network, or may be multiple forward nodes on the network. However, this embodiment of the present invention is not limited thereto.

It should be further understood that, the first forward node may directly receive the MPLS forwarding path information sent by the controller, or may receive the MPLS forwarding path information sent by the second forward node. The second forward node is a forward node that is on the network and has a connection relationship with the first forward node, where the connection relationship refers to a physical or virtual connection channel between forward nodes. However, this embodiment of the present invention is not limited thereto. As shown in FIG. 1, for example, when the first forward node is a forward node A3, the second forward node may be any one or more of forward nodes A1, A4, and A5.

In 110, the MPLS forwarding path information received by the first forward node includes: the ingress node information, the transit node information, and the egress node information, where the ingress node information, the transit node information, and the egress node information are used to indicate all the forward nodes that the MPLS forwarding path passes through. The node information may be an IP address or other feature information of a forward node, which is not limited in this embodiment of the present invention, as long as the ingress node information, the transit node information, and the egress node information can allow the first forward node to learn which forward nodes the MPLS forwarding path passes through.

In 120, the first forward node sends the MPLS forwarding path information to the third forward node. It should be understood that, the third forward node is one or more forward nodes that are on the network and have connection relationships with the first forward node. The following specifically describes the third forward node with reference to FIG. 1: it is assumed that the first forward node is the forward node A3 shown in FIG. 1. In a first case, when the forward node A3 receives the MPLS forwarding path information sent by the controller, the third forward node may be any one or more of the forward nodes A1, A4, and A5, that is, the forward node A3 may send the MPLS forwarding path information to any one or more of the forward nodes A1, A4, and A5. In a second case, for example, when the forward node A3 receives the MPLS forwarding path information sent by the forward node A1, the third forward node may be any one or more of the forward nodes A4 and A5, that is, the forward node A3 may send the MPLS forwarding path information to any one or two of A4 and A5. It should be understood that, when sending the MPLS forwarding path information to the third forward node, the first forward node does not send the MPLS forwarding path information to the sender of the MPLS forwarding path information again.

Specifically, after receiving the MPLS forwarding path information, for example, the first forward node encapsulates the MPLS forwarding path information into, for example, the Interior Gateway Protocol (Interior Gateway Protocol, IGP) protocol, and sends the MPLS forwarding path information to the third forward node by using the IGP protocol.

The IGP protocol may be the Open Shortest Path First (Open Shortest Path First, OSPF) protocol, or may be the Intermediate System Intermediate System (Intermediate System Intermediate System, IS-IS) protocol. The following provides description by using extension of the OSPF protocol as an example.

An OSPF Opaque LSA (Link State Advertisement, Link State Advertisement) Type is used for carrying, and the Opaque LSA Type is defined to be 100. Each element on a path is carried in a standard type-length-value (Type-Length-Value, TLV) format, specifically as shown in Table 1.

TABLE 1

| Type | Length | Value |
| --- | --- | --- |
| Type = 1 | Length | Path ID |
| Type = 2 | Length | Path Length |
| Type = 3 | Length | Path Forward entry Count |
| Type = 4 | Length | Globe Label |
| Type = 5 | Length | Ingress Node |
| Type = 6 | Length | Ingress Node Out Interface |
| Type = 7 | Length | Transit Node |

TABLE 1-continued

| Type | Length | Value |
| --- | --- | --- |
| Type = 8 | Length | Transit Node Out Interface |
| Type = 9 | Length | Egress Node |

Type=1 indicates that the following is a path identity (Path ID); Type=2 indicates that the following is a path length (Path Length) (a quantity of nodes that the path passes through); Type=3 indicates that the following is a path forward entry count (Path Forward entry Count); Type=4 indicates that the following is a path global label (Globe Label); Type=5 indicates that the following is path ingress node information (Ingress Node); Type=6 indicates that the following is a name of a path ingress node outbound interface (Ingress Node Out Interface); Type=7 indicates that the following is path transit node information (Transit Node); Type=8 indicates that the following is a name of a path transit node outbound interface (Transit Node Out Interface); and Type=9 indicates that the following is path egress node information (Egress Node).

It should be understood that, node information in the path ingress node information, path transit node information, and egress node information is used to indicate a feature of a forward node that the path passes through, for example, may include an IP address of the forward node.

In this embodiment of the present invention, the protocol used by the first forward node to send the MPLS forwarding path information to the third forward node may be another related protocol in addition to the IGP protocol, which is not limited by this embodiment of the present invention.

In 130, after acquiring the MPLS forwarding path information, the first forward node may generate the MPLS forward entry of the first forward node according to the MPLS forwarding path information.

In this embodiment of the present invention, optionally, as shown in FIG. 3, the generating an MPLS forward entry of the first forward node according to the MPLS forwarding path information includes:

131: Determine, according to any information of the ingress node information, the transit node information, and the egress node information that are in the MPLS forwarding path information, whether the first forward node is included in the MPLS forwarding path.

132: When determining that the first forward node is included in the MPLS forwarding path, generate the MPLS forward entry of the first forward node according to the MPLS forwarding path information.

The first forward node determines whether the first forward node is included in the MPLS forwarding path according to the ingress node information, the transit node information, and the egress node information that are included in the received MPLS forwarding path information, and when determining that the first forward node is included in the MPLS forwarding path, parse related information in the MPLS forwarding path information, and generate the MPLS forward entry of the first forward node.

Therefore, according to the forward entry generating method in this embodiment of the present invention, a controller sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and reducing occupation of outbound bandwidth of the controller.

Specifically, the MPLS forwarding path information carries the ingress node information, the transit node information, and the egress node information, for example, the node information may include IP addresses of an ingress node, a transit node, and an egress node, so that the first forward node determines whether the first forward node is included in the MPLS forwarding path according to an IP address of the first forward node. For example, the first forward node compares the IP address of the first forward node with IP addresses, which are carried in the MPLS forwarding path information, of forward nodes that the MPLS forwarding path passes through, when determining that an IP address that is the same as the IP address of the first forward node exists in the IP addresses of the forward nodes that the MPLS forwarding path passes through, may determine that the first forward node is on the MPLS forwarding path, and then may determine the MPLS forward entry of the first forward node according to the MPLS forwarding path information.

The MPLS forwarding path information further includes names of outbound interfaces of the ingress node and the transit node and an MPLS label allocated by the Controller to the MPLS forwarding path, in addition to the ingress node information, the transit node information, and the egress node information. Specifically, a specific form of the MPLS forwarding path information varies according to different allocated MPLS labels. For example, when the MPLS label allocated by the Controller to the MPLS forwarding path is a global MPLS label, the MPLS forwarding path information includes: the ingress node information, the name of the outbound interface of the ingress node, the transit node information, the name of the outbound interface of the transit node, the egress node information, and the global MPLS label, that is, the MPLS forwarding path has only one global MPLS label, for example, 3000, and the global MPLS label uniquely indicates the MPLS forwarding path. When the MPLS label allocated by the Controller to the MPLS forwarding path is a local MPLS label, specifically, the Controller allocates one local MPLS label to each forward node that the MPLS forwarding path passes through, and the MPLS forwarding path information includes: the ingress node information, the name of the outbound interface of the ingress node, a local MPLS label of the ingress node, the transit node information, the name of the outbound interface of the transit node, a local MPLS label of the transit node, the egress node information, and a local MPLS label of the egress node. That is, when the local MPLS label is allocated to the MPLS forwarding path, a quantity of MPLS labels is the same as a quantity of the forward nodes that the MPLS forwarding path passes through.

After acquiring the MPLS forwarding path information, the first forward node may determine the MPLS forward entry of the first forward node according to the MPLS forwarding path information. The MPLS forward entry includes an incoming label, an outgoing label, and the name of the outbound interface, and the first forward node may generate the MPLS forward entry of the first forward node according to the MPLS forwarding path information.

The following describes, by using an example, a process in which the first forward node generates the MPLS forward entry of the first forward node according to the received MPLS forwarding path information. Herein, it is assumed that the MPLS forwarding path indicated by the MPLS forwarding path information received by the first forward node includes the first forward node.

For example, the first forward node is the forward node A3 shown in FIG. 1, and an IP address of the forward node A3 is IP3, for example, MPLS forwarding path information received by the first forward node A3 includes: an IP address IP1 of the ingress node A1, an outbound interface eth2/2/0 of the ingress node A1, an IP address IP3 of the transit node A3, an outbound interface eth3/0/0 of the transit node A3, an IP address IP4 of the egress node A4, and a global MPLS label 3000. That is, an MPLS forwarding path indicated by the MPLS forwarding path information is A1A3A4, and the controller allocates the global MPLS label 3000 to the MPLS forwarding path. Then, the first forward node A3 may generate an MPLS forward entry of the first forward node A3 according to the MPLS forwarding path information, where the MPLS forward entry of A3 includes:

an incoming label: 3000, an outgoing label: 3000, and a name eth3/0/0 of the outbound interface.

Specifically, the incoming label and the outgoing label of the MPLS forward entry of the first forward node A3 are determined according to the global MPLS label 3000, and the outbound interface eth3/0/0 is determined according to the outbound interface eth3/0/0 of the transit node A3; by comparing the IP addresses, the first forward node A3 determines that the first forward node is the transit node A3 in the MPLS forwarding path information, and therefore determines a name of an outbound interface of the MPLS forward entry of the first forward node A3 according to the outbound interface eth3/0/0 of the transit node A3.

The foregoing describes, by using the example, that the first forward node generate the MPLS forward entry of the first forward node according to the MPLS forwarding path information that includes the global MPLS label, and the following describes, by using an example, that the first forward node generates the MPLS forward entry of the first forward node according to the MPLS forwarding path information that includes the local MPLS label.

The forward node A3 shown in FIG. 1 is still used as an example of the first forward node. An IP address of the forward node A3 is IP3, and MPLS forwarding path information received by the first forward node A3 includes: an IP address IP1 of the ingress node A1, an outbound interface eth2/2/0 of the ingress node A1, a local MPLS label 10 of the ingress node A1, an IP address IP3 of the transit node A3, an outbound interface eth3/0/0 of the transit node A3, a local MPLS label 20 of the transit node A3, an IP address IP4 of the egress node A4, and a local MPLS label 30 of the egress node A4. That is, an MPLS forwarding path indicated by the MPLS forwarding path information is A1A3A4, and the controller allocates the local MPLS labels, that is, A1 (10)-A3 (20)-A4 (30), to the MPLS forwarding path. Then, the first forward node A3 may generate an MPLS forward entry of the first forward node A3 according to the MPLS forwarding path information, where the forward entry of A3 includes:

an incoming label: 20, an outgoing label: 30, and a name eth3/0/0 of the outbound interface.

Specifically, the incoming label of the MPLS forward entry of the first forward node A3 is determined according to the local MPLS label 20 of the transit node A3, the outgoing label is determined according to the local MPLS label 30 of the egress node A4, and the outbound interface eth3/0/0 is determined according to the outbound interface eth3/0/0 of the transit node A3. The first forward node A3 determines, according to the IP addresses, that the first forward node is the transit node A3 in the MPLS forwarding path information, and therefore determines the name of the outbound interface of the MPLS forward entry of the first forward node A3 according to the outbound interface eth3/0/0 of the transit node A3.

After receiving the MPLS forwarding path information, all the forward nodes included on the MPLS forwarding path generate corresponding MPLS forward entries according to the MPLS forwarding path information and based on the foregoing method, and then may perform MPLS packet forwarding according to the MPLS forward entries.

Therefore, according to the forward entry generating method in this embodiment of the present invention, a controller sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and reducing occupation of outbound bandwidth of the controller.

In this embodiment of the present invention, after receiving the MPLS forwarding path information, each forward node continues to send the MPLS forwarding path information to a surrounding forward node that has a connection relationship with the forward node. Therefore, a phenomenon appears: for example, the first forward node is the forward node A3 shown in FIG. 1, and it is assumed that the first forward node A3 already generates an MPLS forward entry on the MPLS forwarding path A1A3A4; when receiving again the MPLS forwarding path information that indicates the MPLS forwarding path A1A3A4, the first forward node A3 continues to determine, according to any information of the ingress node information, the transit node information, and the egress node information that are in the MPLS forwarding path information, whether the first forward node is included in the MPLS forwarding path, and when determining that the first forward node is included in the MPLS forwarding path, generates the MPLS forward entry of the first forward node according to the MPLS forwarding path information. As a result, the same MPLS forward entry is generated repeatedly, causing a waste of resources of the first forward node. For this case, the Controller sets different corresponding path IDs for different MPLS forwarding paths, and includes the path IDs in MPLS forwarding path information sent to a forward node.

In this embodiment of the present invention, optionally, the MPLS forwarding path information further includes a path ID of the MPLS forwarding path; and the determining, according to any information of the ingress node information, the transit node information, and the egress node information that are in the MPLS forwarding path information, whether the first forward node is included in the MPLS forwarding path includes:

determining whether MPLS forwarding path record information of the first forward node includes the path ID, where the MPLS forwarding path record information is used to record a path ID of an MPLS forwarding path corresponding to an MPLS forward entry that is already generated by the first forward node; and when determining that the MPLS forwarding path record information of the first forward node does not include the path ID, determining, according to any information of the ingress node information, the transit node information, and the egress node information that are in the MPLS forwarding path information, whether the first forward node is included in the MPLS forwarding path.

It should be understood that, path IDs of different MPLS forwarding paths are different. Each time the first forward node generates one MPLS forward entry, the first forward node records a path ID of an MPLS forwarding path corresponding to the MPLS forward entry into the MPLS forwarding path record information of the first forward node. In this way, for each piece of received MPLS forwarding path information, it is first determined whether the MPLS forwarding path record information of the first forward node includes a path ID of an MPLS forwarding path indicated by the MPLS forwarding path information; and if it is determined that the MPLS forwarding path record information of the first forward node already includes the path ID of the MPLS forwarding path, it indicates that the first forward node already generates an MPLS forward entry corresponding to the MPLS forwarding path, the MPLS forwarding path information is discarded, and is not processed; or if it is determined that the MPLS forwarding path record information of the first forward node does not include the path ID of the MPLS forwarding path, steps 131 and 132 shown in FIG. 3 are performed.

It should be understood that, the path ID indicates one unique MPLS forwarding path. From the first time the first forward node generates an MPLS forward entry, the first forward node adds a path ID of a corresponding MPLS forwarding path to local MPLS forwarding path record information; next time when the first forward node receives MPLS forwarding path information, the first forward node first determines whether the local MPLS forwarding path record information includes a path ID carried in the MPLS forwarding path information; and if determining that the local MPLS forwarding path record information does not include the path ID carried in the MPLS forwarding path information, the first forward node continues to perform a subsequent action of generating an MPLS forward entry; or if determining that the local MPLS forwarding path record information already includes the path ID carried in the MPLS forwarding path information, the first forward node discards the MPLS forwarding path information, and does not perform any processing on the MPLS forwarding path information. By determining a path ID, repeated generating of a same MPLS forward entry is prevented, and occupation of a resource of a forward node can be effectively reduced.

Therefore, according to the forward entry generating method in this embodiment of the present invention, MPLS forwarding path information carries a path ID, so that after receiving the MPLS forwarding path information, a forward node determines the path ID, thereby effectively preventing repeated generating of a same MPLS forward entry and effectively reducing occupation of a resource of the forward node.

After receiving MPLS forwarding path information, each forward node on the network sends the MPLS forwarding path information to a surrounding forward node that has a connection relationship with the forward node. However, in fact, for one MPLS forwarding path, as long as all the forward nodes that the MPLS forwarding path passes through already receive the MPLS forwarding path information, the corresponding MPLS forward entries are generated. In this case, the MPLS forwarding path information does not need to be sent to another forward node. For this problem, the controller further includes, in the MPLS forwarding path information sent to a forward node, a total node quantity of the forward nodes that the MPLS forwarding path passes through and a quantity of nodes that already generate MPLS forward entries among the forward nodes that the MPLS forwarding path passes through, so that the first forward node determines whether the first forward node needs to continue to send the MPLS forwarding path information to another forward node.

Optionally, in this embodiment of the present invention, the MPLS forwarding path information further includes a first node quantity and a second node quantity, where the first node quantity indicates a total node quantity of forward nodes that the MPLS forwarding path passes through, and the second node quantity indicates a quantity of nodes that already generate MPLS forward entries among the forward nodes that the MPLS forwarding path passes through.

The sending the MPLS forwarding path information to a third forward node includes:

determining a value relationship between the first node quantity and the second node quantity; and when determining that the first node quantity is unequal to the second node quantity, sending the MPLS forwarding path information to the third forward node.

After receiving the MPLS forwarding path information, the first forward node first determines whether to generate an MPLS forward entry, on the MPLS forwarding path, of the first forward node, and if determining to generate the MPLS forward entry of the first forward node, adds 1 to the second node quantity included in the MPLS forwarding path information, or if determining not to generate the MPLS forward entry, on the MPLS forwarding path, of the first forward node, does not perform any processing on the second node quantity included in the MPLS forwarding path information. After determining whether to generate the MPLS forward entry, the first forward node determines a value relationship between the first node quantity and the second node quantity, that is, a value relationship between the total node quantity of the forward nodes that the MPLS forwarding path passes through and the quantity of the nodes that already generate the MPLS forward entries among the forward nodes that the MPLS forwarding path passes through, and when determining that the second node quantity is equal to the first node quantity, which indicates that all the forward nodes that the MPLS forwarding path passes through already generate respective MPLS forward entries, stops sending the MPLS forwarding path information to the third forward node, or when determining that the second node quantity is not equal to the first node quantity, which indicates that on the MPLS forwarding path, there is still a forward node that does not generate an MPLS forward entry, continues to send the MPLS forwarding path information to the third forward node.

It should be understood that, the second node quantity included in the MPLS forwarding path information, that is, the quantity of the nodes that already generate the MPLS forward entries among the forward nodes that the MPLS forwarding path passes through, is a global variable, where a numerical value of the second node quantity accordingly varies according to the generating of the MPLS forward entries. Specifically, an initial numerical value of the second node quantity included in the MPLS forwarding path information initially generated by the controller is zero. Before the controller sends the MPLS forwarding path information the forward nodes, no forward node that the MPLS forwarding path indicated by the MPLS forwarding path information passes through has generated a corresponding MPLS forward entry. Therefore, the second node quantity is zero by default. After the MPLS forwarding path information is sent to the forward nodes, each time an MPLS forward entry on the MPLS forwarding path is generated, a corresponding forward node adds 1 to the second node quantity. For example, after receiving the MPLS forwarding path information, the first forward node determines that the MPLS forward entry of the first forward node is generated, and then adds 1 to the second node quantity included in the MPLS forwarding path information. Optionally, the second node quantity may be a global counter, and each time a forward node among all the forward nodes that the MPLS forwarding path passes through generates a corresponding MPLS forward entry, the global counter adds 1. In a specific implementation process, the second node quantity may further be a global variable in another form, which is not limited by this embodiment of the present invention.

It should be understood that, in this embodiment of the present invention, after receiving the MPLS forwarding path information, the first forward node first determines the MPLS forward entry of the first forward node according to the MPLS forwarding path information, and then determines whether to send the MPLS forwarding path information to another forward node by comparing the first node quantity with the second node quantity. In this way, ineffective spreading of the MPLS forwarding path information on the network can be effectively prevented; besides, a time used by a forward node to parse the MPLS forwarding path information can be shortened, and energy consumption of the forward node can be reduced.

Therefore, in this embodiment of the present invention, before sending the MPLS forwarding path information to another forward node, a forward node that receives the MPLS forwarding path information first determines whether to generate an MPLS forward entry, then determines the total node quantity of the forward nodes that the MPLS forwarding path passes through and the quantity of the nodes that currently already generate the MPLS forward entries among the forward nodes that the MPLS forwarding path passes through, where the two quantities are carried in the MPLS forwarding path information, and then determines whether to send the MPLS forwarding path information to another forward node, which can effectively prevent ineffective sending of the MPLS forwarding path information and can effectively reduce consumption of a resource of a forward node.

It should be understood that, in the various embodiments of the present invention, sequence numbers of the foregoing processes do not mean an executing sequence. The executing sequence of the processes should be determined according to functions and internal logic of the processes, and shall not constitute any limitation on implementation processes of the embodiments of the present invention.

Therefore, according to the forward entry generating method in this embodiment of the present invention, a controller sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and lowering a requirement on outbound bandwidth of the controller.

Figure 4:
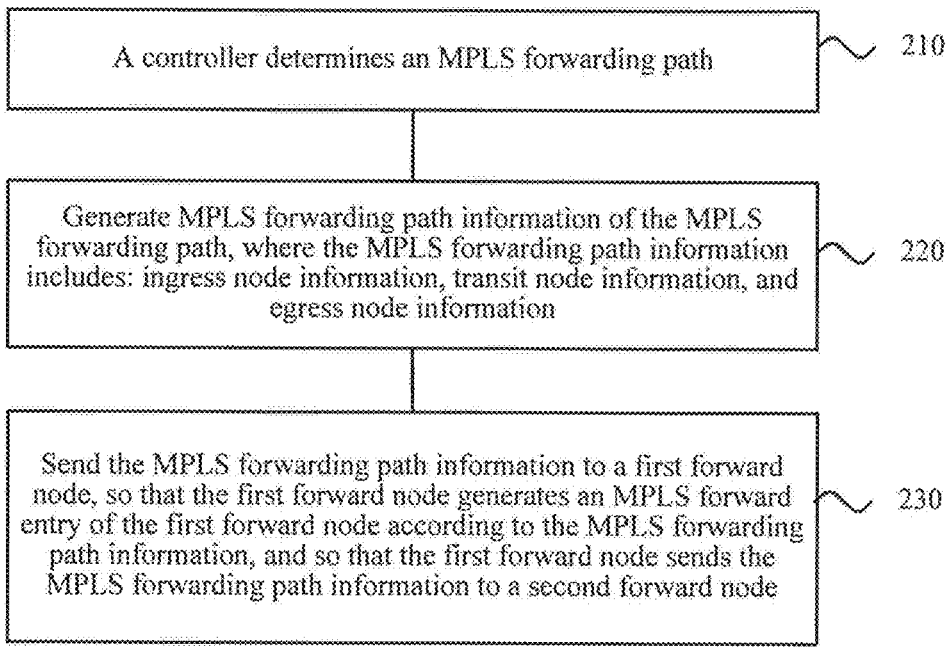
FIG. 4 is a schematic flowchart of a forward entry generating method according to another embodiment of the present invention.

With reference to FIG. 1 to FIG. 3, the foregoing describes the forward entry generating method according to the embodiments of the present invention in detail from the perspective of a forward node. With reference to FIG. 4, the following describes the forward entry generating method according to the embodiments of the present invention from the perspective of a Controller.

Referring to FIG. 4, FIG. 4 shows a forward entry generating method 200 according to an embodiment of the present invention. For example, the method 200 may be executed by a Controller. The method 200 includes:

210: A Controller determines an MPLS forwarding path.

220: Generate MPLS forwarding path information of the MPLS forwarding path, where the MPLS forwarding path information includes: ingress node information, transit node information, and egress node information.

230: Send the MPLS forwarding path information to a first forward node, so that the first forward node generates an MPLS forward entry of the first forward node according to the MPLS forwarding path information, and so that the first forward node sends the MPLS forwarding path information to a second forward node.

The controller determines the MPLS forwarding path according to a service need, generates the MPLS forwarding path information, where the MPLS forwarding path information indicates the MPLS forwarding path, and the MPLS forwarding path information includes: the ingress node information, the transit node information, and the egress node information, where the node information indicates forward nodes that the MPLS forwarding path passes through, and after generating the MPLS forwarding path information, sends the MPLS forwarding path information to the first forward node on a network, so that the first forward node generates the MPLS forward entry, and so that the first forward node sends the MPLS forwarding path information to the second forward node.

Therefore, according to the forward entry generating method in this embodiment of the present invention, a controller sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and lowering a requirement on outbound bandwidth of the controller.

It should be understood that, the first forward node in this embodiment of the present invention is any one or more forward nodes on the network, the second forward node is a forward node that is on the network and has a connection relationship with the first forward node, and the connection relationship refers to a physical or virtual connection channel between forward nodes. However, this embodiment of the present invention is not limited thereto.

It should be further understood that, the first forward node in the forward entry generating method 200 according to this embodiment of the present invention corresponds to the first forward node in the forward entry generating method 100 according to an embodiment of the present invention; and the second forward node in the forward entry generating method 200 according to this embodiment of the present invention corresponds to the third forward node in the forward entry generating method 100 according to an embodiment of the present invention.

It should be further understood that, the controller may send the MPLS forwarding path information to the first forward node by using the Path Computation Element Protocol (Path Computation Element Protocol, PCEP), the OpenFlow protocol, or another self-defined protocol. However, this embodiment of the present invention is not limited thereto.

Optionally, the node information in the ingress node information, the transit node information, and the egress node information may be an IP address of a forward node. However, this embodiment of the present invention is not limited thereto, as long as the ingress node information, the transit node information, and the egress node information can enable the forward node to determine, after receiving the MPLS forwarding path information, whether the MPLS forwarding path includes this forward node.

In this embodiment of the present invention, the MPLS forwarding path information further includes an MPLS label allocated by the Controller to the MPLS forwarding path, so that the forward node generates the MPLS forward entry.

In this embodiment of the present invention, the MPLS label allocated by the Controller to the MPLS forwarding path may be a local MPLS label, or may be a global MPLS label. However, this embodiment of the present invention is not limited thereto.

Optionally, in this embodiment of the present invention, the MPLS label is a global MPLS label, and the global MPLS label uniquely indicates the MPLS forwarding path.

MPLS forwarding path information corresponding to an MPLS forwarding path to which a global MPLS label is allocated includes the following information: ingress node information, transit node information, egress node information, and the global MPLS label.

The controller allocates a global MPLS label to the MPLS forwarding path, that is, allocates only one MPLS label, for example, 3000, to the MPLS forwarding path, where the global MPLS label uniquely indicates the MPLS forwarding path. For example, a global MPLS label 3000 is allocated to an MPLS forwarding path A1A3A4, and MPLS forwarding path information corresponding to the MPLS forwarding path may be: an IP address of an ingress node A1, an outbound interface eth2/2/0 of the ingress node A1, an IP address of a transit node A3, an outbound interface eth3/0/0 of the transit node, an IP address of an egress node A4, and the global MPLS label 3000.

It should be understood that, when a global MPLS label is allocated to an MPLS forwarding path, corresponding MPLS forwarding path information needs to carry only one label; therefore, a size of a packet corresponding to the MPLS forwarding path information of the allocated global MPLS label is relatively small, and in this way, outbound bandwidth of the controller can be saved. In addition, a time used by the forward node to parse a relatively small packet is relatively short, which can increase efficiency of generating an MPLS forward entry.

In this embodiment of the present invention, the controller may also allocate a local MPLS label to an MPLS forwarding path.

In this embodiment of the present invention, optionally, the MPLS label is a local MPLS label, and the local MPLS label indicates an MPLS label allocated by the Controller to each forward node that the MPLS forwarding path passes through.

MPLS forwarding path information corresponding to an MPLS forwarding path to which a local MPLS label is allocated includes the following information: ingress node information, a local MPLS label of an ingress node, transit node information, a local MPLS label of a transit node, egress node information, and a local MPLS label of an egress node.

When allocating a local MPLS label to an MPLS forwarding path, the controller needs to allocate one local MPLS label to each forward node that the MPLS forwarding path passes through. The MPLS forwarding path A1A3A4 is still used as an example. The controller allocates local MPLS labels A1 (10)-A3 (20)-A4 (30) to forward nodes on the forwarding path, and then corresponding MPLS forwarding path information includes the following information: the IP address of the ingress node A1, the outbound interface eth2/2/0 of the ingress node A1, a local MPLS label 10 of the ingress node A1, the IP address of the transit node A3, the outbound interface eth3/0/0 of the transit node, a local MPLS label 20 of the transit node A3, the IP address of the egress node A4, and a local MPLS label 30 of the egress node A4.

When receiving MPLS forwarding path information, a forward node on an MPLS forwarding path can generate an MPLS forward entry of the forward node according to the MPLS forwarding path information, where the MPLS forward entry includes an incoming label, an outgoing label, and a name of an outbound interface. It should be understood that, a method and a procedure for generating an MPLS forward entry according to MPLS forwarding path information by a forward node in the forward entry generating method 200 according to this embodiment of the present invention correspond to the method and the procedure for generating an MPLS forward entry in the forward entry generating method 100 according to an embodiment of the present invention. For simplicity, details are not described again herein.

Therefore, according to the forward entry generating method in this embodiment of the present invention, a controller sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and lowering a requirement on outbound bandwidth of the controller.

Optionally, in this embodiment of the present invention, the MPLS forwarding path information further includes a path ID of the MPLS forwarding path.

It should be understood that, each MPLS forwarding path has a unique path ID, for example, a path ID 1 may be allocated to the forwarding path A1A3A4. The MPLS forwarding path information includes the path ID of the MPLS forwarding path, so as to prevent repeated generating of a same MPLS forward entry after a forward node receives the MPLS forwarding path information. A specific method and procedure correspond to the method and the procedure for generating an MPLS forward entry in the forward entry generating method 100 according to an embodiment of the present invention. For simplicity, details are not described again herein.

In this embodiment of the present invention, optionally, the MPLS forwarding path information further includes a first node quantity and a second node quantity, where the first node quantity indicates a total node quantity of forward nodes that the MPLS forwarding path passes through, and the second node quantity indicates a quantity of nodes that already generate MPLS forward entries among the forward nodes that the MPLS forwarding path passes through.

It should be understood that, the second node quantity included in the MPLS forwarding path information, that is, the quantity of the nodes that already generate the MPLS forward entries among the forward nodes that the MPLS forwarding path passes through, is a global variable, where a numerical value of the second node quantity accordingly varies according to the generating of the MPLS forward entries. Specifically, an initial numerical value of the second node quantity included in the MPLS forwarding path information initially generated by the controller is zero. Before the controller sends the MPLS forwarding path information the forward nodes, no forward node that the MPLS forwarding path indicated by the MPLS forwarding path information passes through has generated a corresponding MPLS forward entry. Therefore, the second node quantity is zero by default. After the MPLS forwarding path information is sent to the forward nodes, each time an MPLS forward entry on the MPLS forwarding path is generated, a corresponding forward node adds 1 to the second node quantity. For example, after receiving the MPLS forwarding path information, the first forward node determines that the MPLS forward entry of the first forward node is generated, and then adds 1 to the second node quantity included in the MPLS forwarding path information. Optionally, the second node quantity may be a global counter, and each time a forward node among all the forward nodes that the MPLS forwarding path passes through generates a corresponding MPLS forward entry, the global counter adds 1. In a specific implementation process, the second node quantity may further be a global variable in another form, which is not limited by this embodiment of the present invention.

It should be understood that, in the various embodiments of the present invention, sequence numbers of the foregoing processes do not mean an executing sequence. The executing sequence of the processes should be determined according to functions and internal logic of the processes, and shall not constitute any limitation on implementation processes of the embodiments of the present invention.

Therefore, according to the forward entry generating method in this embodiment of the present invention, a controller sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and lowering a requirement on outbound bandwidth of the controller.

With reference to FIG. 1 to FIG. 4, the foregoing describes the forward entry generating method according to the embodiments of the present invention in detail. With reference to FIG. 5 to FIG. 10, the following describes a forward node and a controller (Controller) according to embodiments of the present invention in detail.

Figure 5:
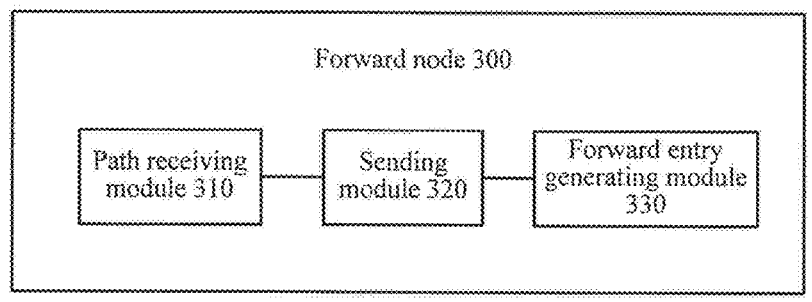
FIG. 5 is a schematic structural diagram of a forward node according to an embodiment of the present invention.

Referring to FIG. 5, FIG. 5 is a schematic structural diagram of a forward node 300 according to an embodiment of the present invention. As shown in FIG. 5, the forward node 300 includes:

a path receiving module 310, configured to receive MPLS forwarding path information, which is sent by a Controller or a second forward node, of an MPLS forwarding path, where the MPLS forwarding path information includes: ingress node information, transit node information, and egress node information;

a sending module 320, configured to send the MPLS forwarding path information received by the path receiving module 310 to a third forward node; and a forward entry generating module 330, configured to generate an MPLS forward entry of the forward node according to the MPLS forwarding path information received by the path receiving module 310.

Figure 6:
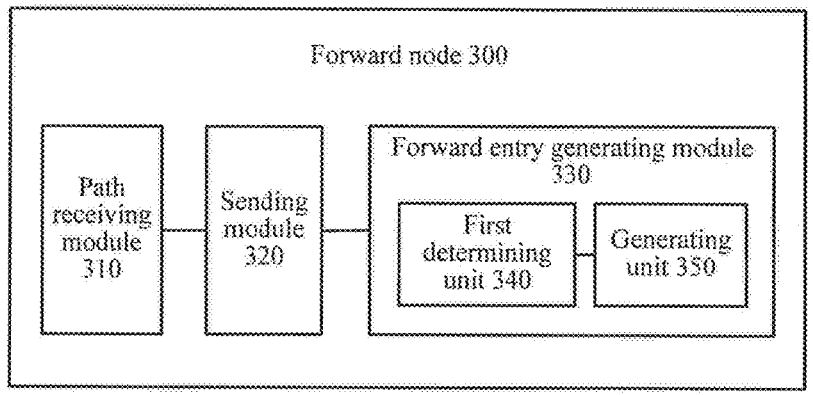
FIG. 6 is another schematic structural diagram of a forward node according to an embodiment of the present invention.

In this embodiment of the present invention, optionally, as shown in FIG. 6, the forward entry generating module 330 includes:

a first determining unit 340, configured to determine, according to any information of the ingress node information, the transit node information, and the egress node information that are in the MPLS forwarding path information, whether the first forward node is included in the MPLS forwarding path received by the path receiving module 310; and a generating unit 350, configured to: when the first determining unit 340 determines that the forward node is included in the MPLS forwarding path, generate the MPLS forward entry of the forward node according to the MPLS forwarding path information.

Figure 7:
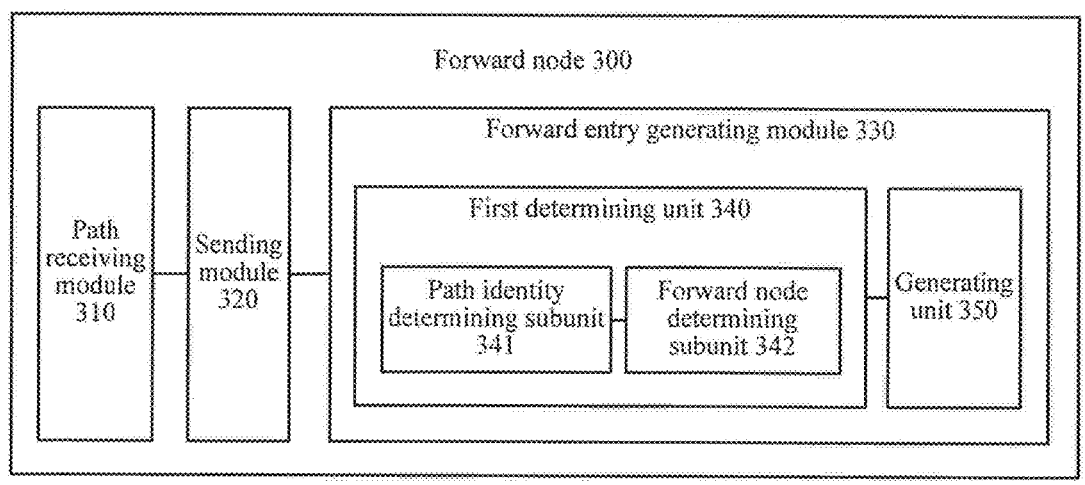
FIG. 7 is still another schematic structural diagram of a forward node according to an embodiment of the present invention.

In this embodiment of the present invention, optionally, as shown in FIG. 7, the MPLS forwarding path information received by the path receiving module 310 further includes a path identity ID of the MPLS forwarding path, and the first determining unit 340 further includes:

a path identity determining subunit 341, configured to determine whether MPLS forwarding path record information of the first forward node includes the path ID, where the MPLS forwarding path record information is used to record a path ID of an MPLS forwarding path corresponding to an MPLS forward entry that is already generated by the first forward node; and a forward node determining subunit 342, configured to: when the path identity determining subunit 341 determines that the MPLS forwarding path record information of the first forward node does not include the path ID, determine whether the forward node is included in the MPLS forwarding path according to any information of the ingress node information, the transit node information, and the egress node information that are in the MPLS forwarding path information.

Figure 8:
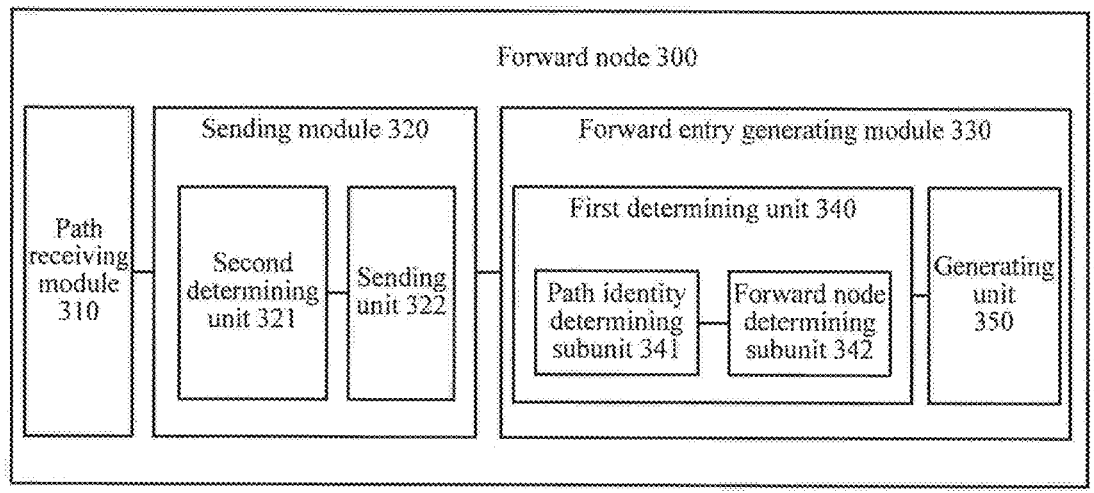
FIG. 8 is still another schematic structural diagram of a forward node according to an embodiment of the present invention.

In this embodiment of the present invention, optionally, as shown in FIG. 8, the MPLS forwarding path information received by the path receiving module 310 further includes a first node quantity and a second node quantity, where the first node quantity indicates a total node quantity of forward nodes that the MPLS forwarding path passes through, and the second node quantity indicates a quantity of nodes that already generates MPLS forward entries among the forward nodes that the MPLS forwarding path passes through, and the sending module 320 includes:

a second determining unit 321, configured to determine a value relationship between the first node quantity and the second node quantity; and a sending unit 322, configured to: when the second determining unit 321 determines that the first node quantity is unequal to the second node quantity, send the MPLS forwarding path information to the third forward node.

It should be understood that, the forward node 300 according to this embodiment of the present invention corresponds to the first forward node in the forward entry generating method 100 according to an embodiment of the present invention, and the foregoing and other operations and/or functions of the modules and units in the forward node 300 are separately for implementing corresponding procedures of the methods in FIG. 1 to FIG. 3. For simplicity, details are not described again herein.

Therefore, according to the forward node 300 in this embodiment of the present invention, a controller sends MPLS forwarding path information to the forward node 300, and the forward node 300 sends the MPLS forwarding path information to another forward node on a network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and reducing occupation of outbound bandwidth of the controller.

Figure 9:
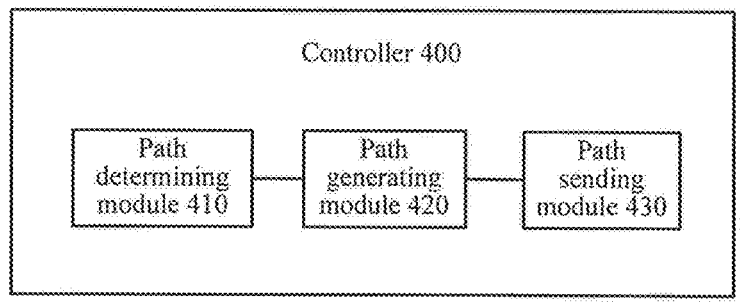
FIG. 9 is a schematic structural diagram of a controller according to an embodiment of the present invention.
Figure 10:
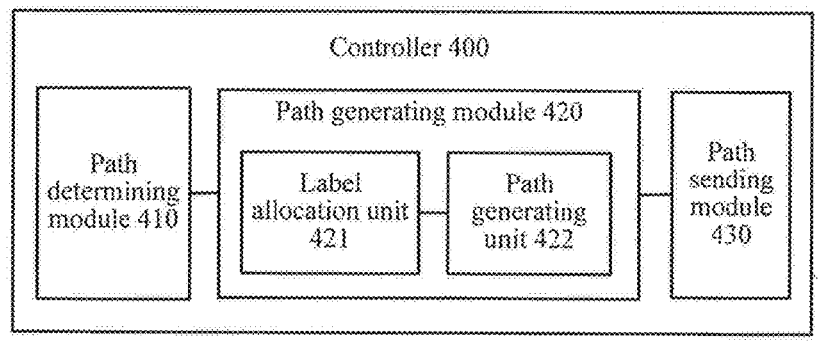
FIG. 10 is another schematic structural diagram of a controller according to an embodiment of the present invention.

With reference to FIG. 5 to FIG. 8, the foregoing describes the forward node according to the embodiments of the present invention in detail. With reference to FIG. 9 and FIG. 10, the following describes a controller (Controller) according to embodiments of the present invention in detail.

FIG. 9 shows a schematic structural diagram of a controller (Controller) 400 according to an embodiment of the present invention. As shown in FIG. 9, the controller 400 includes:

a path determining module 410, configured to determine an MPLS forwarding path;

a path generating module 420, configured to generate MPLS forwarding path information of the MPLS forwarding path determined by the path determining module 410, where the MPLS forwarding path information includes: ingress node information, transit node information, and egress node information; and a path sending module 430, configured to send the MPLS forwarding path information generated by the path determining module 410 to a first forward node, so that the first forward node generates an MPLS forward entry of the first forward node according to the MPLS forwarding path information, and so that the first forward node sends the MPLS forwarding path information to a second forward node.

In this embodiment of the present invention, optionally, as shown in FIG. 10, the path generating module 420 includes:

a label allocation unit 421, configured to allocate an MPLS label to the MPLS forwarding path determined by the path determining module 410; and a path generating unit 422, configured to generate the MPLS forwarding path information of the MPLS forwarding path, where the MPLS forwarding path information further includes the MPLS label.

Optionally, in this embodiment of the present invention, the MPLS label allocated by the label allocation unit 421 to the MPLS forwarding path is a global MPLS label, and the MPLS label included in the MPLS forwarding path information generated by the path generating unit 422 is the global MPLS label.

In this embodiment of the present invention, optionally, the label allocation unit 421 allocates a local MPLS label to each forward node that the MPLS forwarding path passes through, where the MPLS label included in the MPLS forwarding path information generated by the path generating unit 422 is the local MPLS label of each forward node that the MPLS forwarding path passes through.

Optionally, in this embodiment of the present invention, the path generating module 420 is further configured to generate a path identity ID of the MPLS forwarding path.

Optionally, in this embodiment of the present invention, the path generating module 420 is further configured to generate a first node quantity and a second node quantity, where the first node quantity indicates a total node quantity of forward nodes that the MPLS forwarding path passes through, and the second node quantity indicates a quantity of nodes that already generate MPLS forward entries among the forward nodes that the MPLS forwarding path passes through.

It should be understood that, the controller (Controller) 400 according to this embodiment of the present invention may correspond to the controller in the forward entry generating method according to an embodiment of the present invention, and the foregoing and other operations and/or functions of the modules and units in the controller 400 are separately for implementing corresponding procedures of the methods in FIG. 1 to FIG. 8. For simplicity, details are not described again herein.

Therefore, according to the controller 400 in this embodiment of the present invention, the controller 400 sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller 400 from sending, in a point-to-point manner, the MPLS forward entries to all the forward nodes that the MPLS forwarding path passes through, thereby effectively improving efficiency of generating an MPLS forward entry and reducing occupation of outbound bandwidth of the controller 400.

Figure 11:
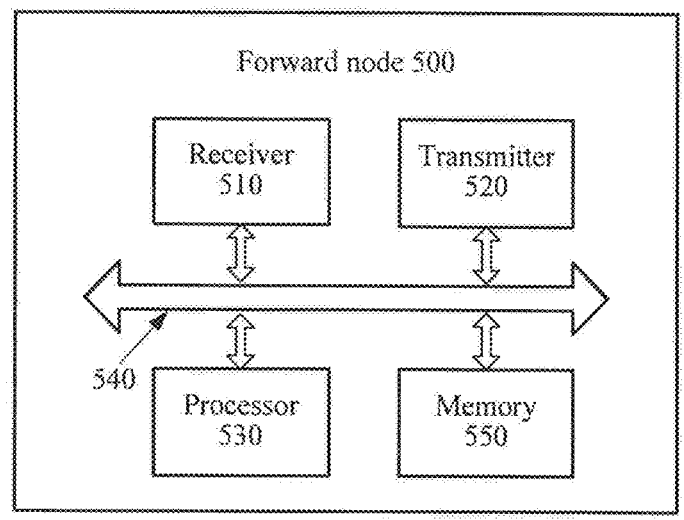
FIG. 11 is a schematic structural diagram of a forward node according to another embodiment of the present invention.

As shown in FIG. 11, an embodiment of the present invention further provides a forward node 500, where the forward node 500 includes a receiver 510, a transmitter 520, a processor 530, a bus system 540, and a memory 550. The receiver 510, the transmitter 520, the processor 530, and the memory 550 are connected to each other by using the bus system 540, the memory 550 is configured to store an instruction, and the processor 530 is configured to execute the instruction stored in the memory 550, to control the receiver 510 to receive a signal, and control the transmitter 520 to send a signal. The receiver 510 is configured to receive MPLS forwarding path information, which is sent by a Controller or a second forward node, of an MPLS forwarding path, where the MPLS forwarding path information includes: ingress node information, transit node information, and egress node information; the transmitter 520 is configured to send the MPLS forwarding path information received by the receiver 510 to a third forward node; and the processor 530 is configured to generate an MPLS forward entry of the forward node 500 according to the MPLS forwarding path information received by the receiver 510.

It should be understood that, in this embodiment of the present invention, the processor 530 may be a central processing unit (Central Processing Unit, CPU), or the processor 530 may be another general purpose processor, digital signal processor (DSP), application-specific integrated circuit (ASIC), or field-programmable gate array (FPGA), or another programmable logic device, discrete gate or transistor logic device, independent hardware component, or the like. The general purpose processor may be a microprocessor, or the processor may be any conventional processor or the like.

The memory 550 may include a read-only memory and a random access memory, and provide an instruction and data to the processor 530. The memory 550 may further include a nonvolatile random access memory. For example, the memory 550 may further store information about a device type.

The bus system 540, besides including a data bus, may further include a power bus, a control bus, a status signal bus, and the like. However, for a purpose of a clear explanation, all buses are marked as the bus system 540 in the figure.

In an implementation process, each step of the method may be completed by using an integrated logic circuit of hardware in the processor 530 or instructions in a software form. The steps with reference to the method disclosed in the embodiments of the present invention may be directly executed and completed by a hardware processor or may be executed and completed by a combination of hardware and software modules in the processor. The software module may be located in a mature storage medium in the art, such as a random access memory, a flash memory, a read-only memory, a programmable read-only memory, an electronically erasable programmable memory, or a register. The storage medium is located in the memory 550, and the processor 530 reads information in the memory 550, and completes the steps of the method in combination with the hardware thereof. To avoid repetition, detailed description is not provided again herein.

Optionally, as an embodiment, the generating, by the processor 530, an MPLS forward entry of the forward node 500 according to the MPLS forwarding path information includes: determining whether the forward node is included in the MPLS forwarding path 500 according to any information of the ingress node information, the transit node information, and the egress node information that are in the MPLS forwarding path information; and when determining that the forward node is included in the MPLS forwarding path 500, generating the MPLS forward entry of the forward node 500 according to the MPLS forwarding path information.

Optionally, as an embodiment, the MPLS forwarding path information received by the receiver 510 further includes a path identity ID of the MPLS forwarding path, and the processor 530 is configured to determine whether MPLS forwarding path record information of the forward node 500 includes the path ID, where the MPLS forwarding path record information is used to record a path ID of an MPLS forwarding path corresponding to an MPLS forward entry that is already generated by the forward node 500; and when determining that the MPLS forwarding path record information of the forward node 500 does not include the path ID, determine whether the forward node is included in the MPLS forwarding path 500 according to any information of the ingress node information, the transit node information, and the egress node information that are in the MPLS forwarding path information.

Optionally, as an embodiment, the MPLS forwarding path information received by the receiver 510 further includes a first node quantity and a second node quantity, where the first node quantity indicates a total node quantity of forward nodes that the MPLS forwarding path passes through, and the second node quantity indicates a quantity of nodes that already generate MPLS forward entries among the forward nodes that the MPLS forwarding path passes through; the processor 530 is further configured to determine a value relationship between the first node quantity and the second node quantity; and the transmitter 510 is further configured to: when the processor 530 determines that the first node quantity is unequal to the second node quantity, send the MPLS forwarding path information to the third forward node.

It should be understood that, the forward node 500 according to this embodiment of the present invention may correspond to the first forward node in the forward entry generating method 100 according to an embodiment of the present invention, or may correspond to the forward node 300 according to an embodiment of the present invention, and the foregoing and other operations and/or functions of the modules in the forward node 500 are separately for implementing corresponding procedures of the methods in FIG. 2 and FIG. 3. For simplicity, details are not described again herein.

Therefore, according to the forward node 500 in this embodiment of the present invention, a controller sends MPLS forwarding path information to the forward node 500, and the forward node 500 sends the MPLS forwarding path information to another forward node on a network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and reducing occupation of outbound bandwidth of the controller.

Figure 12:
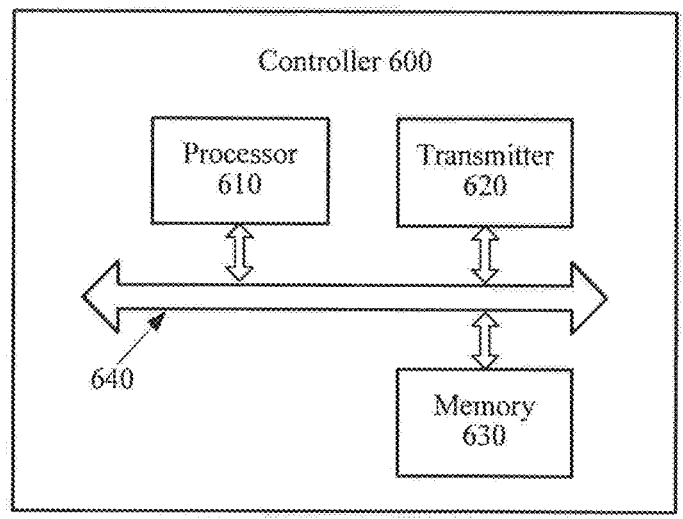
FIG. 12 is a schematic structural diagram of a controller according to another embodiment of the present invention.

As shown in FIG. 12, an embodiment of the present invention further provides a controller 600, where the controller 600 includes a processor 610, a transmitter 620, a memory 630, and a bus system 640. The processor 610, the transmitter 620, and the memory 630 are connected to each other by using the bus system 640, the memory 630 is configured to store an instruction, and the processor 610 is configured to execute the instruction stored in the memory 630, to control the transmitter 620 to send a signal. The processor 610 is configured to determine an MPLS forwarding path; and generate MPLS forwarding path information of the MPLS forwarding path, where the MPLS forwarding path information includes: ingress node information, transit node information, and egress node information; the transmitter 620 is configured to send the MPLS forwarding path information generated by the processor 610 to a first forward node, so that the first forward node generates an MPLS forward entry of the first forward node according to the MPLS forwarding path information, and so that the first forward node sends the MPLS forwarding path information to a second forward node.

It should be understood that, in this embodiment of the present invention, the processor 610 may be a central processing unit (Central Processing Unit, CPU for short), or the processor 610 may be another general purpose processor, digital signal processor (DSP), application-specific integrated circuit (ASIC), or field-programmable gate array (FPGA), or another programmable logic device, discrete gate or transistor logic device, independent hardware component, or the like. The general purpose processor may be a microprocessor, or the processor may be any conventional processor or the like.

The memory 630 may include a read-only memory and a random access memory, and provide an instruction and data to the processor 610. The memory 630 may further include a nonvolatile random access memory. For example, the memory 630 may further store information about a device type.

The bus system 640, besides including a data bus, may further include a power bus, a control bus, a status signal bus, and the like. However, for a purpose of a clear explanation, all buses are marked as the bus system 640 in the figure.

In an implementation process, each step of the method may be completed by using an integrated logic circuit of hardware in the processor 610 or instructions in a software form. The steps with reference to the method disclosed in the embodiments of the present invention may be directly executed and completed by a hardware processor or may be executed and completed by a combination of hardware and software modules in the processor. The software module may be located in a mature storage medium in the art, such as a random access memory, a flash memory, a read-only memory, a programmable read-only memory, an electronically erasable programmable memory, or a register. The storage medium is located in the memory 630, and the processor 610 reads information in the memory 630, and completes the steps of the method in combination with the hardware thereof. To avoid repetition, detailed description is not provided again herein.

Optionally, as an embodiment, the processor 610 is further configured to allocate an MPLS label to the MPLS forwarding path; and generate the MPLS forwarding path information of the MPLS forwarding path, where the MPLS forwarding path information further includes the MPLS label.

Optionally, as an embodiment, the MPLS label allocated by the processor 610 to the MPLS forwarding path is a global MPLS label, and the MPLS label included in the MPLS forwarding path information generated by the processor 610 is the global MPLS label.

Optionally, as an embodiment, the processor 610 is configured to allocate a local MPLS label to each forward node that the MPLS forwarding path passes through, where the MPLS label included in the MPLS forwarding path information generated by the processor 610 is the local MPLS label of each forward node that the MPLS forwarding path passes through.

Optionally, as an embodiment, the processor 610 is further configured to generate a path ID of the MPLS forwarding path.

Optionally, as an embodiment, the processor 610 is further configured to generate a first node quantity and a second node quantity, where the first node quantity indicates a total node quantity of forward nodes that the MPLS forwarding path passes through, and the second node quantity indicates a quantity of nodes that already generate MPLS forward entries among the forward nodes that the MPLS forwarding path passes through.

It should be understood that, the controller 600 according to this embodiment of the present invention may correspond to the controller in the forward entry generating method according to an embodiment of the present invention, or may correspond to the controller 400 according to an embodiment of the present invention, and the foregoing and other operations and/or functions of the modules in the controller 600 are separately for implementing corresponding procedures of the methods in FIG. 2 to FIG. 4. For simplicity, details are not described again herein.

Therefore, according to the controller 600 in this embodiment of the present invention, the controller 600 sends MPLS forwarding path information to some forward nodes on a network, and the some forward nodes send the MPLS forwarding path information to another forward node on the network, so that all forward nodes that the MPLS forwarding path passes through can acquire the MPLS forwarding path information and can generate corresponding MPLS forward entries, which can prevent the controller from sending, in a point-to-point manner, the MPLS forward entries to all the forward nodes that the MPLS forwarding path passes through, thereby effectively improving efficiency of generating an MPLS forward entry and reducing occupation of outbound bandwidth of the controller 600.

In addition, the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that, in the embodiments of the present invention, "B corresponding to A" indicates that B is associated with A, and B may be determined according to A. However, it should be further understood that, determining B according to A does not mean that B is determined according to only A, and B may be determined according to A and/or other information.

A person of ordinary skill in the art may be aware that, in combination with the examples described in the embodiments disclosed in this specification, units may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A forward entry generating method, comprising:
receiving, by a first forward node, Multiprotocol Label Switching (MPLS) forwarding path information, which is sent by a Software Defined Networking (SDN) controller, of an MPLS forwarding path, wherein the MPLS forwarding path information comprises: ingress node information, transit node information, and egress node information;
sending the MPLS forwarding path information to a third forward node without receiving the MPLS forwarding path information from the SDN controller;
generating an MPLS forward entry of the first forward node according to the MPLS forwarding path information;
wherein the MPLS forwarding path information further comprises a first node quantity and a second node quantity, wherein the first node quantity indicates a total node quantity of forward nodes that the MPLS forwarding path passes through, and the second node quantity indicates a quantity of nodes that already generate MPLS forward entries among the forward nodes that the MPLS forwarding path passes through; and
sending the MPLS forwarding path information to a third forward node comprises:
when the first node quantity is unequal to the second node quantity, sending the MPLS forwarding path information to the third forward node.

2. The method according to claim 1, wherein the MPLS forwarding path information further comprises a path identify (ID) of the MPLS forwarding path, wherein generating the MPLS forward entry of the first forward node according to the MPLS forwarding path information comprises:
when MPLS forwarding path record information of the first forward node does not comprise the path ID, determining, according to any information of the ingress node information, the transit node information, and the egress node information, whether the first forward node is comprised in the MPLS forwarding path, wherein the MPLS forwarding path record information is used to record a path ID of an MPLS forwarding path corresponding to an MPLS forward entry that is already generated by the first forward node.

3. A forward entry generating method, comprising:
determining, by a Software Defined Networking (SDN) controller, a Multiprotocol Label Switching (MPLS) forwarding path;
generating MPLS forwarding path information of the MPLS forwarding path, wherein the MPLS forwarding path information comprises: ingress node information, transit node information, and egress node information; and
sending the MPLS forwarding path information to a first forward node, so that the first forward node generates an MPLS forward entry of the first forward node according to the MPLS forwarding path information, and sends the MPLS forwarding path information to a second forward node without receiving the MPLS forwarding path information from the SDN controller;
wherein the MPLS forwarding path information further comprises a first node quantity and a second node quantity, wherein the first node quantity indicates a total node quantity of forward nodes that the MPLS forwarding path passes through, and the second node quantity indicates a quantity of nodes that already generate MPLS forward entries among the forward nodes that the MPLS forwarding path passes through.

4. The method according to claim 3, wherein the MPLS forwarding path information further comprises:
an MPLS label allocated by the controller to the MPLS forwarding path.

5. The method according to claim 4, wherein the MPLS label is a global MPLS label that uniquely indicates the MPLS forwarding path.

6. The method according to claim 4, wherein the MPLS label is a local MPLS label that indicates an MPLS label allocated by the controller to each forward node that the MPLS forwarding path passes through.

7. The method according to claim 3, wherein the MPLS forwarding path information further comprises a path identity (ID) of the MPLS forwarding path.

8. A forward node, comprising:
a processor; and
a memory coupled to the processor, the memory comprising instructions that, when executed by the processor, cause the forward node to:
receive Multiprotocol Label Switching (MPLS) forwarding path information, which is sent by a Software Defined Networking (SDN) controller, of a MPLS forwarding path, wherein the MPLS forwarding path information comprises: ingress node information, transit node information, and egress node information;

send the MPLS forwarding path information to a third forward node without receiving the MPLS forwarding path information from the SDN controller;
generate an MPLS forward entry of the forward node according to the MPLS forwarding path information;
wherein the MPLS forwarding path information further comprises a first node quantity and a second node quantity, wherein the first node quantity indicates a total node quantity of forward nodes that the MPLS forwarding path passes through, and the second node quantity indicates a quantity of nodes that already generate MPLS forward entries among the forward nodes that the MPLS forwarding path passes through; and
to send the MPLS forwarding path information to a third forward node, the instructions, when executed by the processor, cause the forward node to:
when the first node quantity is unequal to the second node quantity, send the MPLS forwarding path information to the third forward node.

9. The forward node according to claim 8, wherein the MPLS forwarding path information further comprises a path identify (ID) of the MPLS forwarding path, wherein generating the MPLS forward entry of the first forward node according to the MPLS forwarding path information comprises:
when MPLS forwarding path record information of the first forward node does not comprise the path ID, determining, according to any information of the ingress node information, the transit node information, and the egress node information, whether the first forward node is comprised in the MPLS forwarding path, wherein the MPLS forwarding path record information is used to record a path ID of an MPLS forwarding path corresponding to an MPLS forward entry that is already generated by the first forward node.

10. A Software Defined Networking (SDN) controller, comprising:
a processor; and
a memory coupled to the processor, the memory comprising instructions that, when executed by the processor, cause the controller to:
determine a Multiprotocol Label Switching (MPLS) forwarding path;
generate MPLS forwarding path information of the MPLS forwarding path, wherein the MPLS forwarding path information comprises: ingress node information, transit node information, and egress node information; and
send the MPLS forwarding path information to a first forward node, so that the first forward node generates an MPLS forward entry of the first forward node according to the MPLS forwarding path information, and sends the MPLS forwarding path information to a second forward node without receiving the MPLS forwarding path information from the SDN controller;
wherein to generate the MPLS forwarding path information, the instructions, when executed by the processor, cause the controller to generate a first node quantity and a second node quantity, wherein the first node quantity indicates a total node quantity of forward nodes that the MPLS forwarding path passes through, and the second node quantity indicates a quantity of nodes that already generate MPLS forward entries among the forward nodes that the MPLS forwarding path passes through.

11. The controller according to claim 10, wherein to generate the MPLS forwarding path information, the instructions, when executed by the processor, cause the controller to:
allocate an MPLS label to the MPLS forwarding path; and
generate the MPLS forwarding path information of the MPLS forwarding path, wherein the MPLS forwarding path information further comprises the MPLS label.

12. The controller according to claim 11, wherein the MPLS label is a global MPLS label.

13. The controller according to claim 11, wherein to allocate the MPLS label to the MPLS forwarding path, the instructions, when executed by the processor, cause the controller to allocate a local MPLS label to each forward node that the MPLS forwarding path passes through.

14. The controller according to claim 10, wherein to generate the MPLS forwarding path information, the instructions, when executed by the processor, cause the controller to generate a path identity (ID) of the MPLS forwarding path.

* * * * *